L. L. TOWER.

Pencils.

No. 6764 Reissued Nov. 23, 1875

WITNESSES.

H. S. Talbot

Edward Edmunds

INVENTOR.

Levi L. Tower.

Per Sylvanus Walker

Atty

THE GRAPHIC CO. PHOTO-LITH. 39 & 41 PARK PLACE, N.Y.

UNITED STATES PATENT OFFICE.

LEVI L. TOWER, OF BOSTON, MASSACHUSETTS, ASSIGNOR TO ORESTES CLEVELAND, OF JERSEY CITY, NEW JERSEY.

IMPROVEMENT IN ERASER-HOLDERS AND PENCIL-POINT PROTECTORS.

Specification forming part of Letters Patent No. 155,272, dated September 22, 1874; reissue No. 6,766, dated November 23, 1875; application filed November 6, 1875.

DIVISION A.

*To all whom it may concern:*

Figure 1:
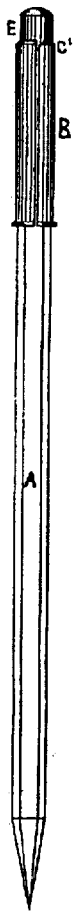
Figure 2:
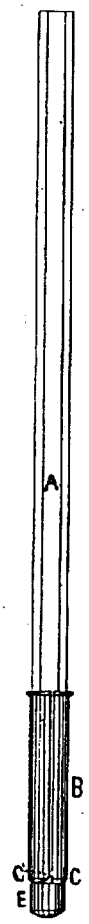
Figure 3:
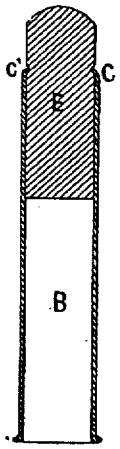
Figure 4:
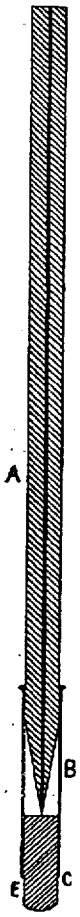
Figure 5:
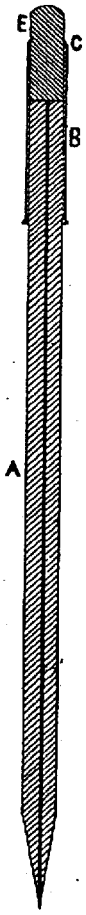

Be it known that I, LEVI L. TOWER, of Boston, county of Suffolk and State of Massachusetts, have invented certain new and useful Improvements in Pencil-Point Protectors and Eraser-Holders combined, of which the following is a specification:

In the drawings, where like letters indicate like parts, Figure 1 shows the eraser and its holder adjusted upon the head of a lead-pencil. Fig. 2 shows the device adjusted for use as a pencil-point protector. Fig. 3 is a longitudinal section of the eraser-holder with the erasive head in position; Fig. 4, a longitudinal section of Fig. 2, and Fig. 5 a similar view of Fig. 1.

The object of my invention is to provide a cheap, simple, and efficient means for holding a rubber eraser, and attaching the same to a lead-pencil in such manner that it may be used upon the head of the pencil for erasing, or be removed therefrom and placed upon the pointed end to protect the same when not in use, and also admit of the adjustment of the rubber eraser within the holder as often as its projecting end is worn away, and yet hold the same firmly when in use against the tendency to displace it, until it is entirely worn out.

The invention consists of an eraser-holding tube adapted to be held upon a lead-pencil, which tube is provided with a screw-thread, by means of which an erasive head introduced within one of its ends is securely held there while in use, and may be adjusted or propelled therein so as to protrude for use or be enveloped for protection.

The device is shown as formed of a cylindrical metallic tube open upon one side its entire length, forming a cylindrical spring, one end thereof being turned inwardly by rolling, swaging, or otherwise bending it, so as to form a curved projection upon the inner surface of such end; and in order to facilitate the adjustment of the rubber eraser in such holder, I shape the inwardly-curved end, commencing at the side opening, by forming one corner shorter than the other, so that it shall present a spirally-formed end, which acts as a screw-thread to propel the rubber eraser, since by turning one part, (as the rubber-eraser head,) and holding the other, (as the tube,) the rubber-eraser head may be forced or carried in and out by the action of the inwardly-curved spiral end of the said holder.

Referring to the drawings, A is a lead-pencil of common construction. B is a cylindrical metallic spring-holder and protector, curved inwardly at its end C. One corner, C′, of this end, is cut shorter than the other, so that its inwardly-curved edge shall act as a screw-thread upon the rubber eraser E, when said eraser is revolved within the same. The eraser-head is cylindrical, and of such diameter as to fit snugly into the holder. The opposite end of the cylindrical spring-holder and protector is formed with an outward-projecting lip or rim, which comes in contact with the pocket or book, and prevents its slipping from the same, as well as from the fingers when in use. The holder may be formed of sheet steel or brass, and may be a solid tube, and nickle-plated to prevent corrosion and give it an ornamental appearance.

Having thus described my invention, what I claim is—

1. A pencil-point protector and eraser-holder combined, consisting of a tube adapted at one end to receive an ordinary lead-pencil, and provided at the other end with a screw-thread for adjustably retaining an erasive head therein, substantially as shown and described.

2. The combination of an erasive head, with a holding-tube adapted at one end for attachment to a lead-pencil, and provided at the other end with a screw-thread for adjustably retaining the erasive head therein, substantially as shown and described.

3. An eraser-holding tube, the body of which is adapted at one end for attachment to a pencil, and at its other end bent or upset so as to form an inwardly-projecting spiral or screw thread for adjustably retaining an erasive head in said tube, substantially as shown and described.

4. The combination of an erasive head, with a holding-tube, the body of which is bent or upset at one end to form an inwardly-projecting spiral or screw thread for adjustably retaining the erasive head in said tube, substantially as shown and described.

5. A holder for attaching erasers to pencils, consisting of a split tube or barrel, having one end shaped to conform to the helix of a screw, and bent or turned inwardly to form a screw-thread for adjustably holding an erasive head, substantially as shown and described.

6. A pencil-point protector and eraser-holder combined, consisting of a tube provided with a screw-thread for adjustably securing an erasive head in one end, and having an interior surface, which adapts it to receive a pencil and cushion its point against the inner end of said erasive head, substantially as shown and described.

In testimony whereof I have hereunto signed my name in the presence of two subscribing witnesses.

LEVI L. TOWER.

Witnesses:
FRED. W. GROBY,
C. E. FOLSOM.